(12) United States Patent
Baudasse et al.

(10) Patent No.: US 9,227,739 B2
(45) Date of Patent: Jan. 5, 2016

(54) MOTORIZATION SYSTEM FOR A HINGE WITH CROSSED WINDING MEANS WITH RELIABILITY-ENHANCED ROLLING

(71) Applicant: THALES, Neuilly-sur-Seine (FR)

(72) Inventors: Yannick Baudasse, Cannes la Bocca (FR); Stephane Vezain, Cannes la Bocca (FR); Didier Stanek, Cannes la Bocca (FR)

(73) Assignee: Thales (FR)

( * ) Notice: Subject to any disclaimer, the term of this patent is extended or adjusted under 35 U.S.C. 154(b) by 112 days.

(21) Appl. No.: 14/062,644

(22) Filed: Oct. 24, 2013

(65) Prior Publication Data

US 2014/0116165 A1 May 1, 2014

(30) Foreign Application Priority Data

Oct. 26, 2012 (FR) ...................................... 12 02860

(51) Int. Cl.
*E04H 12/18* (2006.01)
*B64G 1/22* (2006.01)
*B64G 1/44* (2006.01)

(52) U.S. Cl.
CPC .............. *B64G 1/222* (2013.01); *E04H 12/187* (2013.01); *B64G 1/44* (2013.01); *Y10T 16/5383* (2015.01); *Y10T 16/547* (2015.01); *Y10T 74/18568* (2015.01)

(58) Field of Classification Search
CPC . E04H 12/187; Y10T 16/5383; Y10T 16/547; B64G 1/222
See application file for complete search history.

(56) References Cited

U.S. PATENT DOCUMENTS

| 3,945,053 | A | * | 3/1976 | Hillberry et al. | ............ 623/20.24 |
| 4,073,201 | A | | 2/1978 | Taylor et al. | |
| 4,267,608 | A | * | 5/1981 | Bora, Jr. | ..................... 623/21.15 |
| 4,558,911 | A | * | 12/1985 | Ruoff | .............................. 439/13 |
| 4,619,304 | A | * | 10/1986 | Smith | .............................. 160/135 |
| 5,086,541 | A | * | 2/1992 | Auternaud et al. | ............. 16/227 |
| 8,151,414 | B2 | * | 4/2012 | Baudasse et al. | ............... 16/227 |
| 8,992,108 | B2 | * | 3/2015 | Baudasse et al. | ............ 403/119 |
| 2009/0282646 | A1 | * | 11/2009 | Baudasse et al. | ............... 16/273 |
| 2012/0137801 | A1 | * | 6/2012 | Baudasse et al. | ............ 74/89.14 |
| 2014/0116165 | A1 | * | 5/2014 | Baudasse et al. | ................. 74/89 |
| 2014/0117164 | A1 | * | 5/2014 | Baudasse et al. | .......... 244/172.6 |

FOREIGN PATENT DOCUMENTS

| FR | 2635077 A1 | 2/1990 |
| FR | 2795465 A1 | 12/2000 |
| FR | 2902763 A1 | 12/2007 |
| FR | 2968234 A1 | 6/2012 |
| WO | 8302795 A1 | 2/1983 |

\* cited by examiner

*Primary Examiner* — Andrew J Triggs
(74) *Attorney, Agent, or Firm* — Baker & Hostetler LLP

(57) ABSTRACT

A rolling hinge device comprises two substantially parallel winding cylinders, longitudinal link element-forming winding means, the winding means being able to maintain a predetermined distance between the winding cylinders and being wound around winding cylinders, and at least two flexible tracks, a flexible track being fixed to each winding cylinder, the flexible tracks being arranged facing one another and having a point of contact, a prestressing force being applied at said point of contact of the flexible tracks under the effect of the winding means. At least one flexible track comprises at least one slot produced over at least a part of its length, the slot delimiting a plurality of flexible beam sections of determined profiles.

11 Claims, 3 Drawing Sheets

MOTORIZATION SYSTEM FOR A HINGE WITH CROSSED WINDING MEANS WITH RELIABILITY-ENHANCED ROLLING

CROSS-REFERENCE TO RELATED APPLICATION

This application claims priority to foreign French patent application No. FR 1202860, filed on Oct. 26, 2012, the disclosure of which is incorporated by reference in its entirety.

FIELD OF THE INVENTION

The present invention relates to the motorization systems of elements. It applies notably to the field of the mechanisms for deploying space appendages, such as antennas or solar generators for example.

BACKGROUND

In the abovementioned motorization systems, elements, for example fittings, are typically set in motion relative to one another around hinges. These systems thus comprise lines of hinges that generally use motorization components of the torsion spring, spiral spring or Carpentier joint type, making it possible to counter the resisting torques and to guarantee the necessary margins in terms of torques generated in order to ensure the complete deployment of the appendages.

In this context, the known motorization components exhibit a changing or variable motorization torque involving an over-motorization which brings about shocks at the end of deployment.

These shocks can be significant and can generate damage to the space appendages at the end of deployment, as well as stray torques damaging to the piloting of the spacecraft. To mitigate this problem, the deployable structures can be dimensioned and reinforced so as to be able to withstand the end-of-travel shocks generated in deployment, but this solution is unsatisfactory and notably results in an increased weight for the complete structure.

Some lines of development have led to the devising of deployment mechanisms with almost zero resistive torque. Such mechanisms, such as the line of hinges described in the patent application FR 2635077, offer the advantage of requiring only little motorization power and generate minimized end-of-travel shocks. Other mechanisms are borne out of enhancements made to the above mechanism, notably in terms of weight and volume. Such a deployment mechanism is disclosed in the patent application FR 0605653.

The known mechanisms, such as those described in the abovementioned patent applications FR 2635077 and FR 0605653, have an angular deployment capability that is limited to 180°. Moreover, their overall kinematics, because of their structure, generate very irregular motorization torques. Finally, the speed of deployment of the known deployment mechanisms, as already stated, results in a restoration of energy at the end of travel, therefore a shock, because said speed of deployment is not regulated.

To correct these drawbacks, a motorization device has been proposed with control torque, described in the patent application published under the reference FR 2968234. Such a device makes it possible to have an almost zero resisting torque, and is based on the use of rolling flexible tracks that already exist in the system to produce the motorization. A specific form is given to the flexible tracks so as to allow for an offsetting of the point of contact between the flexible tracks relative to the crossover point of winding means such as wound flexible blades or even cables, forming a link element between two substantially parallel winding cylinders forming fittings with the flexible tracks, to which different components of the system are linked. In this way, a torque dependent on the distance between the abovementioned point of contact and crossover point provokes the mutual rotation of the flexible tracks, and thus the mutual rotation of the fittings. The "crossover point" between the link element-forming winding means should be understood in the wider sense to be the axis substantially parallel to the longitudinal axes or axes of revolution of the fittings, passing at the same time through the two winding means.

In the abovementioned device, a problem may arise when foreign bodies come to be housed between the rolling flexible tracks, possibly resulting in a total jamming of the hinge. The foreign bodies may originate from the space surrounding the device, or else from the device itself, the foreign bodies then possibly being parts of the system that have accidentally become isolated or even residues of matter originating from part erosion phenomena, for example.

SUMMARY OF THE INVENTION

One aim of the present invention is notably to mitigate the abovementioned drawbacks. Thus, there is proposed, through the present invention, a motorization device comprising at least two rolling flexible tracks, the latter being shrewdly configured so as to reduce the risks of jamming in the case of the presence of foreign bodies and advantageously to promote the evacuation of foreign bodies.

More specifically, the subject of the invention is a rolling hinge device comprising two substantially parallel winding cylinders, longitudinal link element-forming winding means, the winding means being able to maintain a predetermined distance between the winding cylinders and being wound around winding cylinders, and at least two flexible tracks, a flexible track being fixed to each winding cylinder, the flexible tracks being arranged facing one another and having a point of contact, a prestressing force being applied at said point of contact of the flexible tracks under the effect of the winding means, at least one flexible track comprising at least one slot produced over at least a part of its length, said slot delimiting a plurality of flexible beam sections of determined profiles.

In one embodiment of the invention, said at least one slot can be produced over the entire length of the flexible track.

In one embodiment of the invention, said at least one slot can be produced over a part of the length of the flexible track.

In one embodiment of the invention, a flexible track may comprise a first plurality of slots produced over the entire length of the flexible track and a second plurality of slots produced over a part of the length of the flexible track.

In one embodiment of the invention, said beam sections may have a rectangular section.

In one embodiment of the invention, said beam sections may have a section of a form from the group comprising round, oval, trapezoidal, square, rhomboid, square or rectangular with rounded corners, and diabolo forms.

In one embodiment of the invention, the slots may be substantially parallel to the lateral edges of a flexible track.

In one embodiment of the invention, the slots may exhibit a determined angle with the lateral edges of a flexible track.

Another subject of the present invention is a deploying system for satellite, comprising at least one first deployable appendage, one second deployable appendage, and also comprising a rolling hinge device according to any one of the embodiments described, the deployable appendages being fixed to each assembly formed by a winding cylinder and a flexible track.

BRIEF DESCRIPTION OF THE DRAWINGS

Other features and advantages of the invention will become apparent from the following description, given in light of the appended drawings which represent.

DETAILED DESCRIPTION

Figure 1:
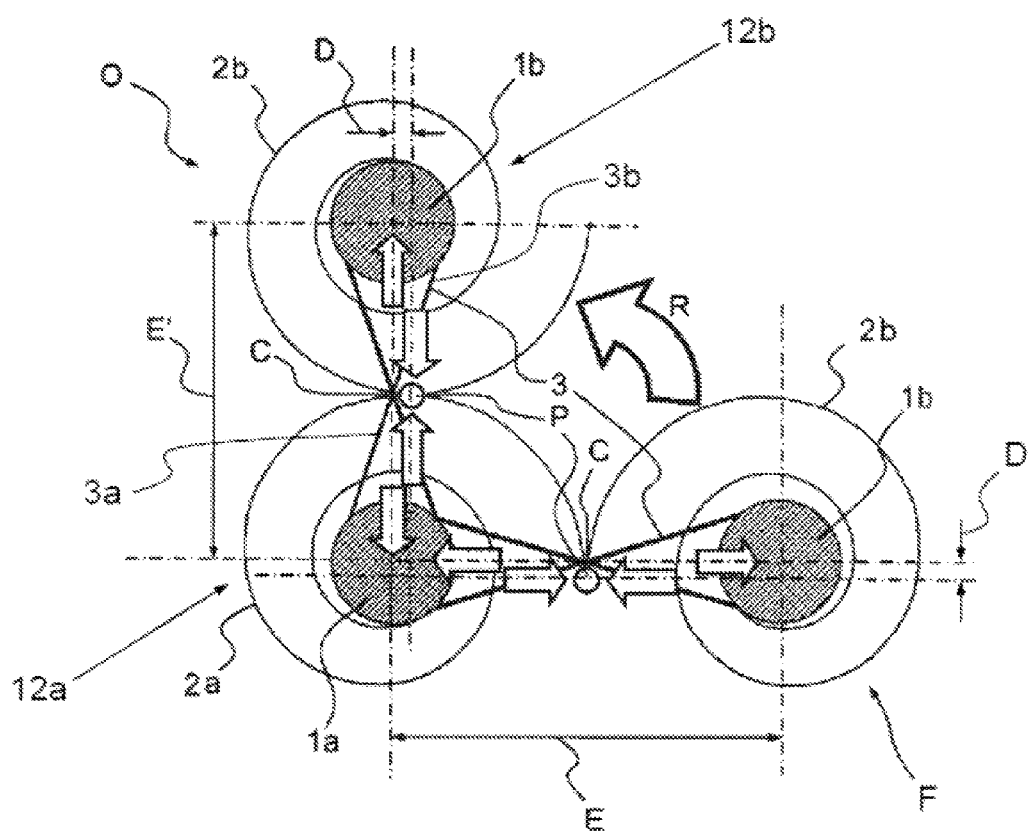
FIG. 1 is a diagram of a rolling hinge system with motorization torque known from the prior art, in stowed and deployed positions.

FIG. 1 shows a diagram illustrating a rolling hinge system with motorization torque as described in the abovementioned patent application FR 2968234. A rolling hinge system with motorization torque comprises substantially parallel winding cylinders 1a, 1b held in position by winding means 3 such as flexible blades, or by any other suitable element, such as, for example, cables. The winding means 3 are wound in a figure of eight around winding cylinders 1a, 1b; taken separately, each winding means notably comprises a linear portion 3a or 3b that crosses at a crossover point C, each linear portion 3a, 3b being extended by a portion of the winding means that is wound around each of the winding cylinders 1a, 1b. The winding means cross at the crossover point C.

Flexible tracks 2a, 2b are respectively connected to each of the winding cylinders 1a, 1b with circular section. The flexible tracks 2a, 2b are arranged facing one another and in contact with one another. An assembly comprising a winding cylinder 1a, 1b and an associated flexible track 2a, 2b forms a fitting 12a, 12b. The winding means 3 induce a prestressing force that is applied at the point of contact P between the flexible tracks 2a, 2b. Because of the basically circular geometry of the winding cylinders 1a, 1b and of the flexible tracks, the point of contact P between the flexible tracks 2a, 2b and the crossover point C of the winding means 3 are aligned on a plane orthogonal to the plane passing through the two axes of revolution of the two winding cylinders 1a, 1b. Appendages, such as solar generators, can be fixed to each winding cylinder/flexible track assembly 1a-2a/1b-2b.

The flexible tracks 2a, 2b may consist of flexible tracks in spiral form. The profile of the flexible tracks 2a, 2b may also be formed by a plurality of spiral portions, and/or by a plurality of portions of circular profile. The specific spiral form makes it possible to offset the point of contact P between flexible tracks 2a, 2b relative to the crossover point C of the winding means 3. The point of contact P and the crossover point C are not located on the same axis parallel to the axes of revolution of the winding cylinders 1a, 1b. This offsetting by a distance D, of the point of contact P relative to the crossover point C, results in the offsetting of the prestressing force induced by the winding means 3 and that applied at the point of contact P. Because of this, a torque R is produced between the point of contact P and the crossover point C inducing the rotation of the fittings 12a, 12b comprising the flexible tracks 2a, 2b and the winding cylinders 1a, 1b. The mutual rotation of the fittings 12a, 12b, because of the spiral form of the flexible tracks 2a, 2b, leads to a variation of the deformation of the flexible tracks 2a, 2b and, more specifically, of the deflection at the point of contact, the centre-to-centre distance between the winding cylinders 1a, 1b being, for its part, constant, with a length E in the closed position F equaling a length E' in the open position O.

The torque R can be adjusted by means of choices made concerning the form of the spiral and concerning the physical characteristics of the flexible tracks 2a, 2b, in particular their elasticity and their rigidity. To increase the torque R exerted on the flexible tracks 2a, 2b, it is possible to increase the offset of the point of contact P relative to the crossover point C by producing a spiral with a significant aperture angle, or to increase the force exerted at the point of contact P by producing a stiffer flexible track. To increase the force exerted at the point of contact C, it is also possible to increase the deflection of the flexible tracks 2a, 2b.

To generate a torque R that is constant during the deployment phase, an Archimedean spiral form may be preferred.

The motorization torque R can also be adapted in order to compensate certain variable friction torques introduced by elements external to the hinge. These may typically be bundles of electrical cables conveying the electricity between two solar generator panels. It is thus possible to obtain a motorization margin that is almost constant throughout the deployment. The motorization demand can then be adjusted as strictly necessary.

More generally, the present invention can be applied to a rolling hinge system comprising at least two flexible tracks, regardless of their forms, and regardless, moreover, of the configuration of the winding means. Thus, the example illustrated by FIGS. 2A and 2B, and described hereinbelow, comprises circular flexible tracks arranged around winding cylinders, and associated with winding means.

Figure 2A:
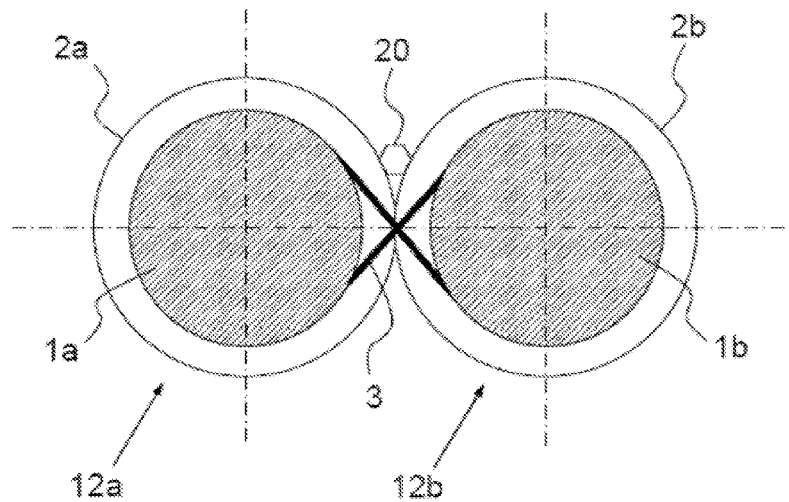
FIGS. 2A and 2B synoptically illustrate a rolling hinge system in the presence of a foreign body.
Figure 2B:
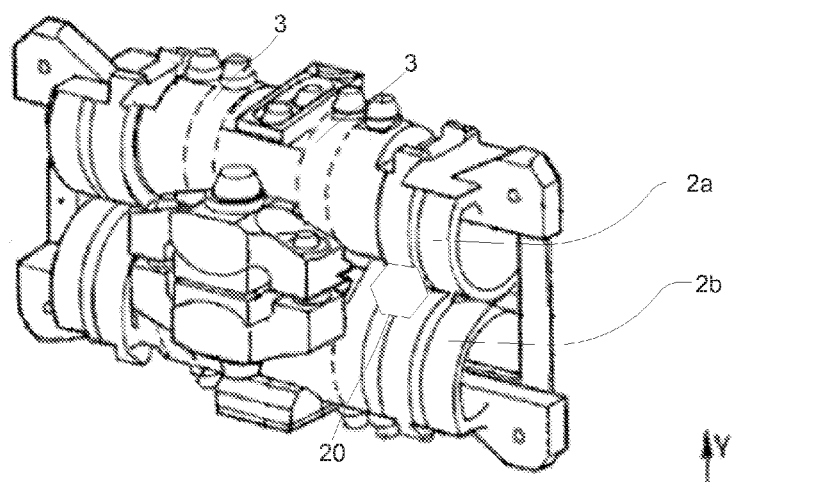
Figure 2B:
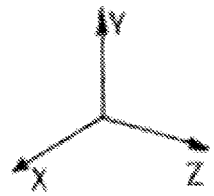

FIGS. 2A and 2B more specifically describe, synoptically, a rolling hinge device in the presence of a foreign body.

The rolling hinge device illustrated by FIGS. 2A and 2B comprises two winding cylinders 1a, 1b like the more specific example described previously with reference to FIG. 1, as well as flexible tracks 2a, 2b and link means 3.

A foreign body 20 may come to be housed between the tracks 2a, 2b, the foreign body 20 then having the potential, during the movement of the motorization device, to be forced to become even more engaged between the flexible tracks 2a, 2b, thus hampering the correct operation of the hinge device by contributing to an undue resistance torque, even resulting in damage to the tracks 2a, 2b, or even to a total jamming of the hinge device.

The present invention makes it possible to reduce such risks, by using flexible tracks and proposing that the flexible tracks be divided so as to distribute the pre-load which is applied to them. To this end, the present invention proposes that the rolling flexible tracks be formed by a plurality of flexible beam sections over which the pre-load can be distributed.

For example, at least a part of each flexible track may comprise at least one slot, produced over all or part of its length, the slot making it possible to delimit a plurality of flexible beam sections. The length of a flexible track should be understood here to mean the dimension according to which the flexible track is wound around a winding cylinder. For the continuation, the lateral edges of a flexible track may be defined like the edges of the flexible track substantially parallel to the length of the flexible track, that is to say being inscribed overall in a plane perpendicular to the longitudinal axis, or axis of revolution, of the winding cylinder around which the flexible track concerned is arranged.

Figure 3A:
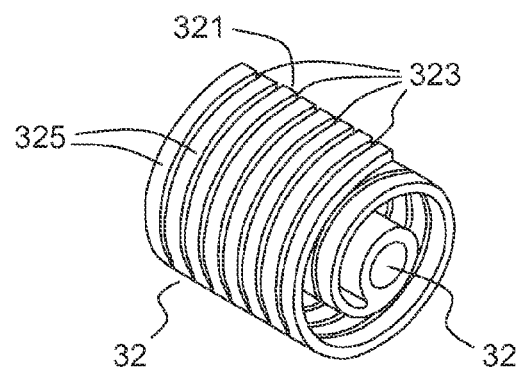
FIGS. 3A, 3B, 3C, are perspective views illustrating different alternative flexible track configurations in a motorization system according to different exemplary embodiments of the invention.
Figure 3B:
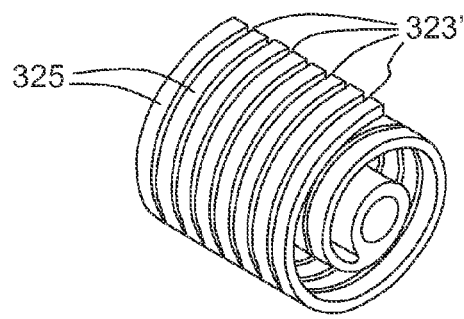
Figure 3C:
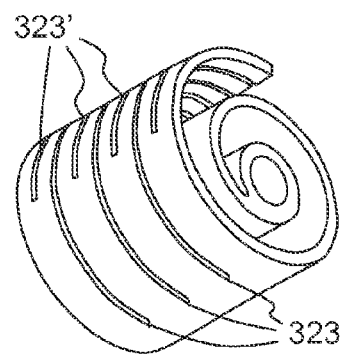

FIGS. 3A to 3C are perspective views illustrating different alternative flexible track configurations, in a rolling hinge system according to different exemplary embodiments of the invention. In the examples thus illustrated, a flexible track 32 has a spiral form, that is wound around a central part 320 forming a cylinder, or else is arranged around a winding cylinder not represented in the figures. This example is not limiting on the present invention. The part of the flexible track 32, in its lengthwise direction as defined previously, situated substantially in the central part 320, can be defined as the proximal part of the flexible track 32, the flexible track 32 extending over its length to a distal part 321, terminated by a distal edge substantially perpendicular to the lateral edges of the flexible track 32.

With reference to FIG. 3A, the flexible track 32 may comprise a plurality of slots 323 produced in the lengthwise direction of the flexible track 32, substantially parallel to one another, parallel to the lateral edges of the flexible track 32, and produced over the entire length of the flexible track 32. The slots 323 extend through a thickness of the flexible track and delimit a plurality of beam sections 325.

With reference to FIG. 3B, the flexible track 32 may, for example, in an alternative embodiment, comprise a plurality of slots 323' produced in the lengthwise direction of the flexible track 32, substantially parallel to one another, parallel to the lateral edges of the flexible track 32, and produced over a part of the length of the flexible track 32, for example extending from a determined distance from the proximal part of the flexible track 32 by moving away therefrom along the length of the flexible track 32, to the dist1 edge of the flexible track 32. The slots 323' delimit a plurality of beam sections 325.

With reference to FIG. 3C, the flexible track 32 may, for example, in an alternative embodiment, comprise a first plurality of slots 323' produced in the lengthwise direction of the flexible track 32, substantially parallel to one another, parallel to the lateral edges of the flexible track 32, and produced over a part of the length of the flexible track 32, for example extending from a determined distance from the proximal part of the flexible track 32 by moving away therefrom along the length of the flexible track 32, to the distil edge of the flexible track 32, like the slots in the embodiment described above with reference to FIG. 3B. Also, the flexible track 32 may comprise, like the embodiment described previously with reference to FIG. 3A, a second plurality of slots 323 produced in the lengthwise direction of the flexible track 32, substantially parallel to one another, parallel to the lateral edges of the flexible track 32, and produced over the entire length of the flexible track 32. The slots 323 of the second plurality of slots, produced over the entire length, and the slots 323' of the first plurality of slots, produced over a part of the length of the flexible track 32, may be alternated.

The examples described above are in no way limiting on the present invention, and it may, for example, be envisaged that the slots not be parallel to the lateral edges of the flexible track. The slots may, for example, form a determined angle with the lateral edges of the flexible track, and thus have a helical form, promoting the evacuation of foreign bodies.

Figure 4:
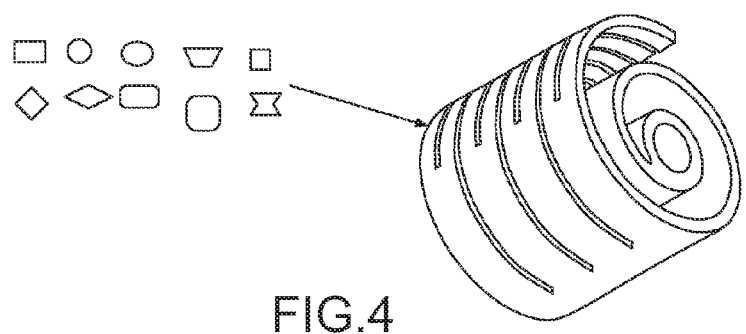
FIG. 4 is a diagram illustrating different alternative profiles of flexible beam sections, according to different exemplary embodiments of the invention.

Advantageously, as is illustrated by FIG. 4, based on an example of flexible track as described previously with reference to FIG. 3C, the beam sections forming a flexible track may have sections of various forms. The beam sections may, for example, have a rectangular section, like the examples illustrated by FIGS. 3A to 3C. They may also have a round or oval section, a trapezoidal section, a square section, a regular or irregular rhomboid section, square or rectangular sections with rounded corners, a section in the form of a diabolo and so on.

The invention claimed is:

1. A rolling hinge device comprising:
   two winding cylinders arranged substantially parallel to each other;
   a longitudinal link element-forming winding means, the winding means being able to maintain a predetermined distance between the two winding cylinders and being wound around the two winding cylinders; and
   at least two flexible tracks, each flexible track of the at least two flexible tracks being fixed to a respective one of the two winding cylinder cylinders,
   wherein the at least two flexible tracks are arranged facing one another and have a point of contact,
   wherein a prestressing force is applied at the point of contact under an effect of the winding means, and
   wherein at least a first flexible track of the at least two flexible tracks includes a first plurality of slots produced over an entirety of a length of the first flexible track and between lateral edges of the first flexible track, and
   wherein the first plurality of slots delimits a plurality of flexible beam sections of determined profiles in the first flexible track that are configured to promote an evacuation of foreign bodies housed between the at least two flexible tracks.

2. The rolling hinge device of claim 1, further comprising at least one slot produced over a part of the length of the first flexible track.

3. The rolling hinge device of claim 1, wherein at least one of the first flexible track and a second flexible track of the at least two flexible tracks includes a second plurality of slots produced over a part of a respective length of the at least one of the first flexible track and the second flexible track.

4. The rolling hinge device according to claim 1, wherein said beam sections have a rectangular section.

5. The rolling hinge device according to claim 1, wherein said beam sections have a section of a form from a group comprising round, oval, trapezoidal, square, rhomboid, square or rectangular with rounded corners, and diabolo forms.

6. The rolling hinge device of claim 1, wherein at least one slot of the plurality of slots is substantially parallel to the lateral edges of the first flexible track.

7. The rolling hinge device of claim 1, wherein at least one slot of the plurality of slots is formed at a determined angle relative to the lateral edges of the first flexible track.

8. A deploying system for a satellite, the deploying system comprising:
   at least one first deployable appendage;
   one second deployable appendage; and
   a rolling hinge device according to claim 1,
   wherein each of the at least one first deployable appendages being appendage and the one second deployable appendage is fixed to each a respective assembly formed by a winding cylinder and a flexible track defined by a respective one of two winding cylinders and corresponding one of at least two flexible tracks of the rolling hinge device according to claim 1.

9. The rolling hinge device of claim 1, wherein at least one slot of the first plurality of slots extends through a thickness of the first flexible track.

10. The rolling hinge device of claim 1,
wherein the first plurality of slots is arranged facing a second flexible track of the at least two flexible tracks, and
wherein the plurality of flexible beam sections are arranged to face and contact the second flexible track.

11. The rolling hinge device of claim 1, wherein at least one slot of the first plurality of slots extends from a distal end of the first flexible track to a proximal end defined by a central part of the first flexible track.

* * * * *